H. A. STEEN.
PROTECTIVE DEVICE.
APPLICATION FILED JULY 22, 1911.
1,110,151.
Patented Sept. 8, 1914.
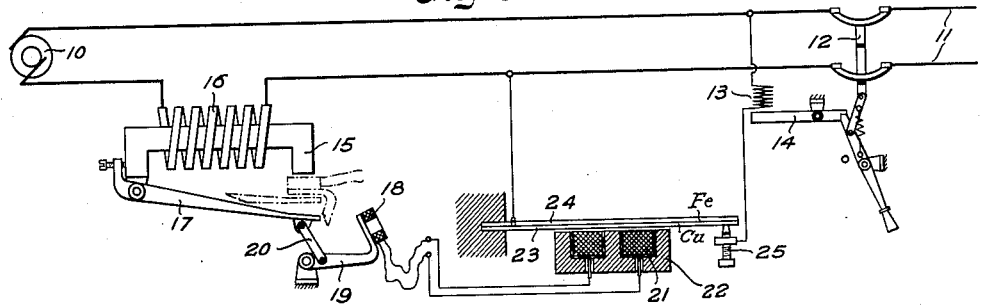
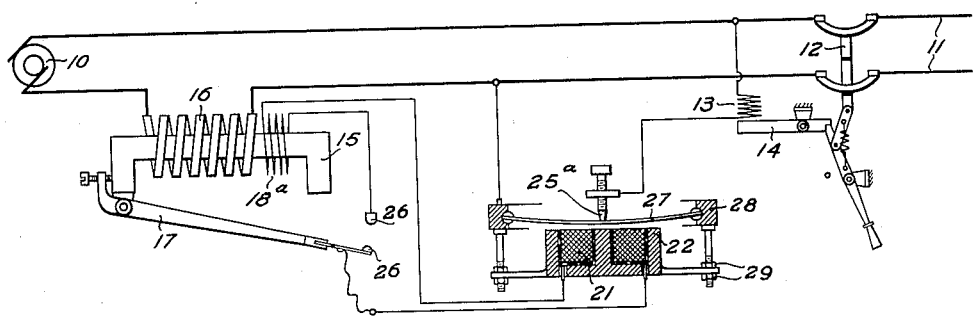
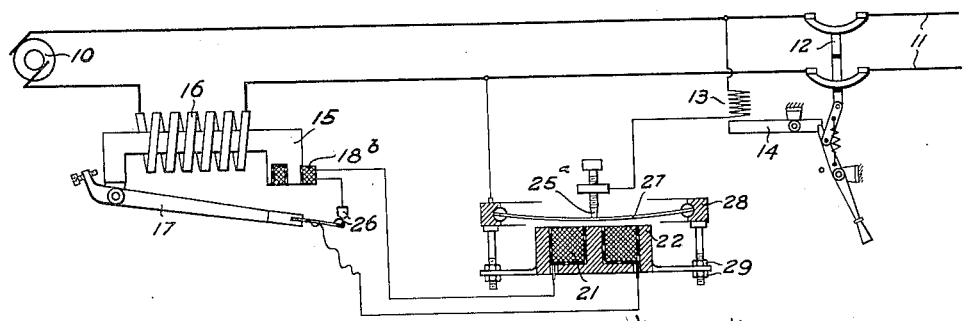

UNITED STATES PATENT OFFICE.

HALFDAN A. STEEN, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

PROTECTIVE DEVICE.

1,110,151.      Specification of Letters Patent.      Patented Sept. 8, 1914.

Application filed July 22, 1911. Serial No. 639,967.

*To all whom it may concern:*

Be it known that I, HALFDAN A. STEEN, a subject of the King of Norway, residing at Milwaukee, in the county of Milwaukee and State of Wisconsin, have invented certain new and useful Improvements in Protective Devices, of which the following is a full, clear, and exact specification.

My invention relates to protective devices. In the operation of electrical apparatus, it is often necessary that an overload or other abnormal condition be allowed to exist for a definite length of time before causing an interruption of the circuit. It is also often desirable that the length of time during which such overload or other abnormal condition may continue vary in inverse sense to the extent of such condition.

It is the main object of my present invention to provide a device for accomplishing these ends which is particularly applicable in connection with alternating current work and has certain advantages over those heretofore proposed.

In carrying out my invention there is provided a coil which is responsive to the abnormal condition, such as an overload, to be protected against, and a second coil which upon the rise of the abnormal condition and the consequent sufficient energization of the first coil will be rendered operative as the secondary winding of a transformer of which the first-named coil is the primary to supply a current which varies in the same sense as does the abnormal condition which is to be protected against. The secondary coil may be made to supply such a current when required either by being moved bodily into and out of inductive relation to the first-named coil or by having its circuit closed and opened. The secondary coil may be so located that it also acts as a shading coil to prevent chattering of the overload device. The current from the secondary coil is preferably supplied to the coil of a magnet located in proximity to a thermostatic device in which eddy currents are induced by the alternating flux of the magnet. These eddy currents heat the thermostatic device and cause it to deflect, and the thermostatic device controls a circuit-breaker in the circuit to be protected.

The various novel features of my invention will be apparent from the description and drawings, and will be particularly pointed out in the claims.

Figure 1 shows diagramatically one system embodying my invention; and Figs. 2 and 3 show modifications.

The device to be protected is shown as an alternating current generator 10 which is connected to a circuit 11 through a circuit breaker 12. This circuit-breaker is biased to open position, but in the arrangement shown is normally held in closed position by a holding coil 13 acting on a latch 14. The coil 13 is shown connected as a no-voltage coil. The circuit of the holding coil 13 is completed through my eddy current thermostat, two forms of which will be described more particularly hereinafter.

An overload responsive device, comprising a core 15 and a coil 16, has its coil connected in any suitable manner, as in series, so as to carry a current proportional to that supplied to the generator 10. The movable armature 17 of the overload device controls a coil which under certain conditions supplies a current varying in the same sense as does that supplied by the generator 10. This coil, which will be referred to as the secondary coil, may be controlled in different manners.

In the arrangement shown in Fig. 1, the secondary coil 18 is mounted on an arm 19 connected by a link 20 to the armature 17. Normally the secondary coil 18 is in the position shown. When the current supplied by the generator 10 exceeds a predetermined value, the armature 17 is raised and the coil 18 is moved into the magnetic field produced by the coil 16, as indicated in dotted lines. The coil 18 then acts as the secondary of a transformer of which the coil 16 is the primary. The coil 18 is connected to the magnetizing coil 21 located in the core 22 of my eddy current thermostat, so that when the coil 18 is moved to the dotted line position it will supply to the coil 21 a current which varies in the same sense as does the current from the generator 10. This variation is a substantially proportional one for the straight part of the saturation curve of the core 15. The flux produced in the core 22 by the coil 21 will produce eddy currents in the thermostat proper, which in the form shown in Fig. 1 is a composite metal strip having a copper strip 23 and an iron strip 24, the iron strip 24 serving also to complete the magnetic circuit of the coil 21. These eddy currents heat the strips 23 and 24. This heating will cause the strips to expand unequally, on account of the different coefficients of expansion of iron and copper, and will thus cause the free end of the thermostat to bend gradually upward. This inequality in expansion will be augmented because of the better conductivity of which the copper strip, in consequence of which the eddy currents, and therefore the heating effect, in the copper strip will be greater than in the iron strip. When the thermostat has been sufficiently heated, which will occur after a time which varies in inverse sense to the current supplied by the generator 10, the thermostat bars will leave the contact 25 and interrupt the circuit of the holding coil 13, thus causing the tripping of the circuit-breaker 12 and the disconnection of the generator 10 from the circuit 11.

In the arrangement shown in Fig. 2 the secondary coil 18$^a$ is mounted permanently in inductive relation to the coil 15 and core 16, but normally has its circuit open at the contacts 26, one of which is stationary and the other carried by the armature 17. When the current supplied by the generator 10 exceeds a predetermined value, the armature 17 is lifted and the contacts 26 brought into engagement. This closes the circuit of the coil 18$^a$ through the magnetizing coil 21 of my eddy current thermostat, another form of which is shown in Fig. 2. The coil 21 in this case also is mounted in a core 22; but here a single slightly bowed metal strip or plate 27 is located close in front of the face of the magnet. The ends of this metal strip are mounted in a rigid frame 28, so that when the strip expands because of the eddy currents produced in it by the coil 21, it is compelled to bow farther instead of expanding linearly. The distance between the diaphragm 27 and the core 22 may be adjusted by nuts 29. When the strip 27 has bowed sufficiently, which will occur when a period of time inversely dependent upon the current supplied by the generator 10 has elapsed after the closing of the contacts 26, such strip leaves the contact 25$^a$ and thereby breaks the circuit of the holding coil 13. This causes the tripping of the circuit-breaker 12 in the manner already described.

The arrangement shown in Fig. 3 differs from that shown in Fig. 2 merely in the location of the secondary coil. Here the secondary coil 18$^b$ is located in the face of the free end of the core 15, embracing but part of such face. In consequence, the coil 18$^b$ not only performs all the functions of the coil 18$^a$ of Fig. 2, but also acts as a shading coil for the overload device and prevents chattering of the armature 17.

In any of the arrangements shown, a cessation of the overload before the tripping of the circuit-breaker will cause the supply of current to the coil 21 to be interrupted, whereupon the thermostat will cool and be ready for operation upon the next occurrence of an overload.

Many modifications may be made in the precise arrangement shown and described, and I aim to cover all such which do not involve a departure from the spirit and scope of my invention as set forth in the appended claims.

What I claim as new is:

1. In an electrically operated time element device, an exciting coil, an armature movable thereby upon sufficient energization thereof, and a secondary coil which upon a movement of the armature by the exciting coil is rendered operative as the secondary of a transformer of which the exciting coil is the primary.

2. In combination, a core, a movable armature therefor, a primary coil wound on said core, a secondary coil, said secondary coil being movable by said armature into and out of position to have currents induced therein.

3. In an electrically-operated time element device for a circuit-breaker, an electromagnet comprising a current-carrying coil, and a secondary coil normally non-inductively related to said first coil and automatically inductively related thereto in response to the passage of current of a predetermined value in said first coil.

4. In apparatus for actuating a time element device, a magnetic element, a current-carrying coil associated with said magnetic element, an electric circuit comprising a coil normally non-inductively related to said magnetic element and means operatively related to said first coil for rendering said second coil operative to absorb energy derived from said magnetic element on the passage of current of a predetermined value through said first coil.

Milwaukee, Wis., July 7, 1911.

In testimony whereof I affix my signature, in the presence of two witnesses.

HALFDAN A. STEEN.

Witnesses:
G. B. SCHLEY,
CHAS. L. BYRON.